United States Patent
Coretto et al.

(10) Patent No.: US 10,711,903 B2
(45) Date of Patent: Jul. 14, 2020

(54) TRANSFER VALVES

(71) Applicant: Hamilton Sundstrand Corporation, Charlotte, NC (US)

(72) Inventors: August M. Coretto, Manchester, CT (US); Aaron F. Rickis, Feeding Hills, MA (US); Francis P. Marocchini, Somers, CT (US); Glenn Gradischer, Canton, CT (US); Richard H. Bostiga, Ellington, CT (US); Ryan Susca, Windsor, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 204 days.

(21) Appl. No.: 15/617,480

(22) Filed: Jun. 8, 2017

(65) Prior Publication Data

US 2018/0355984 A1    Dec. 13, 2018

(51) Int. Cl.
  *F16K 11/07*    (2006.01)
  *F16K 3/316*   (2006.01)
  (Continued)

(52) U.S. Cl.
  CPC .......... *F16K 11/0712* (2013.01); *F16K 3/316* (2013.01); *F16K 11/07* (2013.01);
  (Continued)

(58) Field of Classification Search
  CPC .. F16K 11/0704; F16K 11/0712; F16K 11/07; F15B 13/0402
  See application file for complete search history.

(56) References Cited

U.S. PATENT DOCUMENTS

| | | | |
|---|---|---|---|
| 4,674,526 A | 6/1987 | Athanassiu | |
| 4,741,364 A * | 5/1988 | Stoss | F15B 13/0402 137/625.64 |

(Continued)

FOREIGN PATENT DOCUMENTS

| | | |
|---|---|---|
| CN | 101968128 A | 2/2011 |
| CN | 205781058 U | 12/2016 |
| GB | 569829 A | 6/1945 |

OTHER PUBLICATIONS

European Search Report, of the European Patent Office, dated Oct. 18, 2018, issued in corresponding European Patent Application No. 18176054.7.

(Continued)

*Primary Examiner* — Matthew W Jellett
*Assistant Examiner* — Christopher D Ballman
(74) *Attorney, Agent, or Firm* — Locke Lord LLP; Daniel J. Fiorello; Scott D. Wofsy

(57) ABSTRACT

A transfer valve includes a spool comprising a first circumferential flow channel at a first axial position of the spool and a second circumferential flow channel at a second axial position of the spool. The first circumferential flow channel and the second circumferential flow channel have different circumferential positions and are defined only partially circumferentially, and a sleeve disposed over the spool. The sleeve includes at least three flow windows defined through the sleeve at an axial position of the sleeve, each flow window having different circumferential positions on the sleeve. The spool is configured to translate within the sleeve between a first position and a second position. The first circumferential flow channel of the spool is configured to fluidly connect a first plurality of the at least three windows in the first position, and the second circumferential flow channel is configured to connect a second plurality of the at least three windows in the second position, wherein the first (Continued)

plurality of windows is different by at least one window from the second plurality of windows.

17 Claims, 5 Drawing Sheets

(51) Int. Cl.
   *B64D 37/00* (2006.01)
   *F15B 13/04* (2006.01)
(52) U.S. Cl.
   CPC ........ *B64D 37/005* (2013.01); *F15B 13/0402* (2013.01); *F16K 11/0704* (2013.01)

(56) References Cited

U.S. PATENT DOCUMENTS

| | | | |
|---|---|---|---|
| 5,606,993 A | 3/1997 | Stoll | |
| 5,730,167 A * | 3/1998 | Enoki | F16K 11/07 137/15.02 |
| 6,234,202 B1 | 5/2001 | Grill | |
| 8,397,687 B2 * | 3/2013 | Lichti | F01L 1/3442 123/90.15 |
| 2003/0226593 A1 * | 12/2003 | Okada | F01M 11/03 137/550 |
| 2006/0118066 A1 | 6/2006 | Martins | |
| 2009/0255593 A1 * | 10/2009 | Nordstrom | F16K 31/0613 137/544 |
| 2010/0084031 A1 * | 4/2010 | Hunnicutt | F15B 13/0402 137/625.66 |
| 2010/0229983 A1 * | 9/2010 | Tackes | F16K 3/262 137/625.35 |
| 2011/0005625 A1 * | 1/2011 | Goldfarb | F15B 13/0402 137/625 |
| 2012/0097278 A1 | 4/2012 | Schamann | |
| 2013/0074961 A1 | 3/2013 | Hong et al. | |
| 2014/0097130 A1 * | 4/2014 | Wilfong | F16K 25/005 210/87 |
| 2014/0109979 A1 * | 4/2014 | Rickis | F16K 51/00 137/15.08 |
| 2014/0119956 A1 * | 5/2014 | Ballard | F04C 14/26 417/307 |
| 2015/0129059 A1 * | 5/2015 | Okada | F16K 11/07 137/544 |
| 2015/0233480 A1 * | 8/2015 | Rateike | B01D 29/11 137/549 |
| 2015/0369092 A1 * | 12/2015 | Parker | F16K 11/07 123/90.12 |
| 2017/0082211 A1 * | 3/2017 | Groves | F16K 11/07 |
| 2017/0175924 A1 * | 6/2017 | Gerlach | F16K 15/021 |
| 2017/0218797 A1 * | 8/2017 | Takada | F01L 1/356 |

OTHER PUBLICATIONS

European Office Action issued in corresponding EP Application No. 18176054.7 dated Aug. 20, 2019.

* cited by examiner

TRANSFER VALVES

BACKGROUND

1. Field

The present disclosure relates to valves, more specifically for transfer valves (e.g., for backup systems in aircraft).

2. Description of Related Art

Historically, transfer valves have been used to simultaneous redirect multiple pressure ports. Two types of transfer valves include center flow valves and traditional valves. Traditional valves result in a heavy complex housing due to the multiple plumbing lines that need to be run thereto. Center flow valves reduce the plumbing complexity but introduce additional leakage paths and, thus, result in a larger, more complex valve.

Such conventional methods and systems have generally been considered satisfactory for their intended purpose. However, there is still a need in the art for improved transfer valves. The present disclosure provides a solution for this need.

SUMMARY

In accordance with at least one aspect of this disclosure, a transfer valve includes a spool comprising a first circumferential flow channel at a first axial position of the spool and a second circumferential flow channel at a second axial position of the spool. The first circumferential flow channel and the second circumferential flow channel have different circumferential positions and are defined only partially circumferentially, and a sleeve disposed over the spool.

The sleeve includes at least three flow windows defined through the sleeve at an axial position of the sleeve, each flow window having different circumferential positions on the sleeve. The spool is configured to translate within the sleeve between a first position and a second position.

The first circumferential flow channel of the spool is configured to fluidly connect a first plurality of the at least three windows in the first position, and the second circumferential flow channel is configured to connect a second plurality of the at least three windows in the second position. The first plurality of windows is different by at least one window from the second plurality of windows.

In certain embodiments, the first plurality of the at least three windows can include a first window and a second window. The second plurality can include a second window and a third window. Any other window arrangements and fluid connections in the first and second positions are contemplated herein.

In certain embodiments, the spool can include an at least partially axial channel portion that connects the first circumferential flow channel and the second circumferential flow channel. The at least partially axial channel portion can include any suitable shape (e.g., straight, circumferentially spiral).

The spool can include an anti-rotation slot defined in a portion thereof for receiving an anti-rotation pin, the slot being dimensioned to allow translation between the first position and the second position, but to prevent rotation of the spool within the sleeve. The sleeve can include a pin hole defined therethrough and configured to receive the anti-rotation pin. The valve can include the anti-rotation pin disposed in the pin hole of the sleeve and in the anti-rotation slot of the spool. Multiple combination of anti-rotation features can be incorporated.

The valve can include a housing disposed over the sleeve that includes a port for each window. In certain embodiments, at least one seal can be disposed between the sleeve and the housing such that each window is fluidly isolated between the sleeve and the housing. The at least one seal can include at least one ladder seal or any other suitable seal.

In certain embodiments, the spool can include a plurality of sets of first and second circumferential flow channels in different axial positions. The spool can include one or more seal channels defined therein between the plurality of sets. The valve can include a seal disposed in each seal channel of the spool, for example. The seals in the seal channels can be ring seals, for example, or any other suitable seal.

In accordance with at least one aspect of this disclosure, an aircraft hydraulic system, can include any suitable embodiment of a transfer valve as described herein. It is contemplated that the transfer valve can be used for any other purpose in any other application.

In accordance with at least one aspect of this disclosure, a method of actuating a transfer valve includes axially moving a spool between a first position and a second position relative to a sleeve surrounding the spool, and altering fluidic communication between a first plurality of circumferentially defined windows and a second plurality of circumferentially defined windows in the same axial position as the first plurality of circumferentially defined windows through the axial movement of the spool.

These and other features of the systems and methods of the subject disclosure will become more readily apparent to those skilled in the art from the following detailed description taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION

Figure 1:
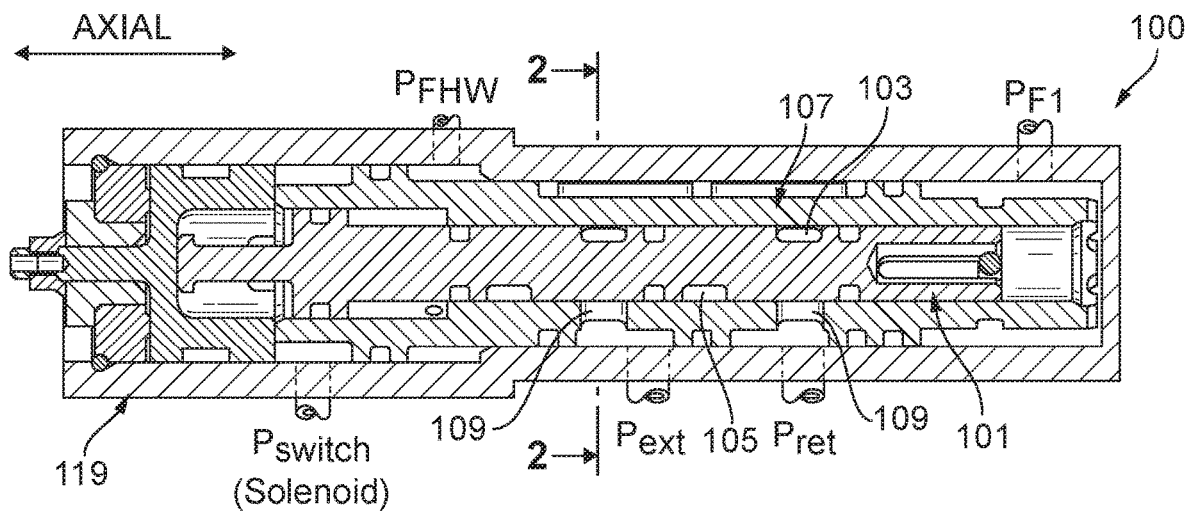
FIG. 1 is a cross-sectional elevation of an embodiment of a valve in accordance with this disclosure.

Reference will now be made to the drawings wherein like reference numerals identify similar structural features or aspects of the subject disclosure. For purposes of explanation and illustration, and not limitation, an illustrative view of an embodiment of a valve is shown in accordance with the disclosure is shown in FIG. 1 and is designated generally by reference character 100. Other embodiments and/or aspects of this disclosure are shown in FIGS. 2-7. The systems and methods described herein can be used to reduce size and weight of valves and related systems, e.g., by reducing the necessary linear length of the valve by having multiple ports in the same axial position.

In accordance with at least one aspect of this disclosure, referring generally to FIGS. 1-4, a transfer valve 100 includes a spool 101 comprising a first circumferential flow channel 103 at a first axial position of the spool 101 and a second circumferential flow channel 105 at a second axial position of the spool 101. As shown, the first circumferential flow channel 103 and the second circumferential flow channel 105 have different circumferential positions on the spool 101 and are defined only partially circumferentially. The flow channels 103, 105 can include any suitable axial or radial dimension.

A sleeve 107 is disposed over the spool 101. The sleeve 107 includes at least three flow windows 109 defined through the sleeve 107 at a particular axial position of the sleeve 107. Each flow window 109 has a different circumferential position on the sleeve 107 as shown.

The spool 101 and the sleeve 107 can be of any suitable shape (e.g., substantially cylindrical as shown, rectilinear, flat). The spool 101 is configured to translate within the sleeve 107 between a first position and a second position. The first circumferential flow channel 103 of the spool 101 is configured to fluidly connect a first plurality of the at least three windows 109 in the first position, and the second circumferential flow channel 105 is configured to connect a second plurality of the at least three windows 109 in the second position. The first plurality of windows 109 is different by at least one window 109 from the second plurality of windows 109.

In certain embodiments, the spool 101 can include an at least partially axial channel portion 111 that connects the first circumferential flow channel 103 and the second circumferential flow channel 105. The axial channel can allow one window of the plurality to always be open. For example, referring additionally to FIGS. 5A and 5B, a window 109b may be an outlet window, and a window 109a can be an inlet window. While switching, window 109b can remain open while window 109a will get closed and then window 109c will be opened. The axial channel portion 111 is not required and the first circumferential flow channel 103 and the second circumferential flow channel 105 can be disconnected and/or discontinuous in any suitable manner.

As appreciated by those having ordinary skill in the art, the axial channel portion 111 allows for constant communication with the common port, without restriction of the flow path. The axial channel portion 111 could be eliminated (e.g., by a barrier between circumferential flow channels 103, 105) and/or can incorporate a metering function of the two circumferential flow channels 103, 105 (e.g., variable area as a function of the spool stroke).

The at least partially axial channel portion 111 can include any suitable shape (e.g., straight, circumferentially spiral). For example, as shown, the at least partially axial channel portion 111 includes a partially toroidal shape and extends straight along in the axial direction.

The spool 101 can include an anti-rotation slot 113 defined in a portion thereof for receiving an anti-rotation pin 115. The slot 113 can be dimensioned to allow translation between the first position and the second position, but to prevent rotation of the spool 101 within the sleeve 107. The sleeve 107 can include a pin hole 117 defined therethrough and configured to receive the anti-rotation pin 115. The valve 100 can include the anti-rotation pin 115 disposed in the pin hole 117 of the sleeve 107 and in the anti-rotation slot 113 of the spool 103.

Figure 2:
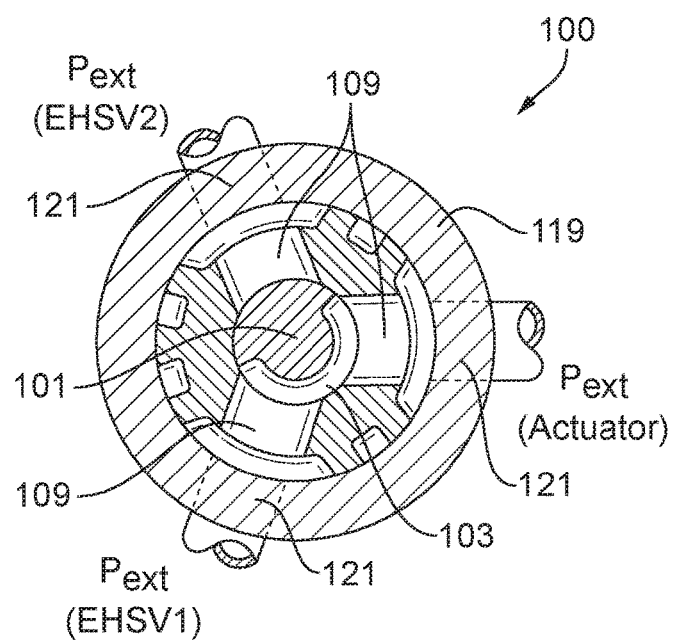
FIG. 2 is a second section view of the embodiment of FIG. 1.
Figure 3:
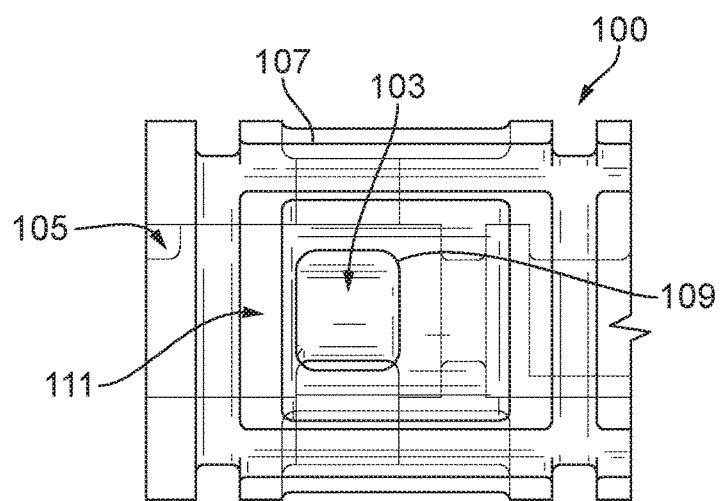
FIG. 3 is a elevation view of the embodiment of FIG. 1, showing the sleeve in a phantom to show features of the spool in the sleeve.
Figure 5A:
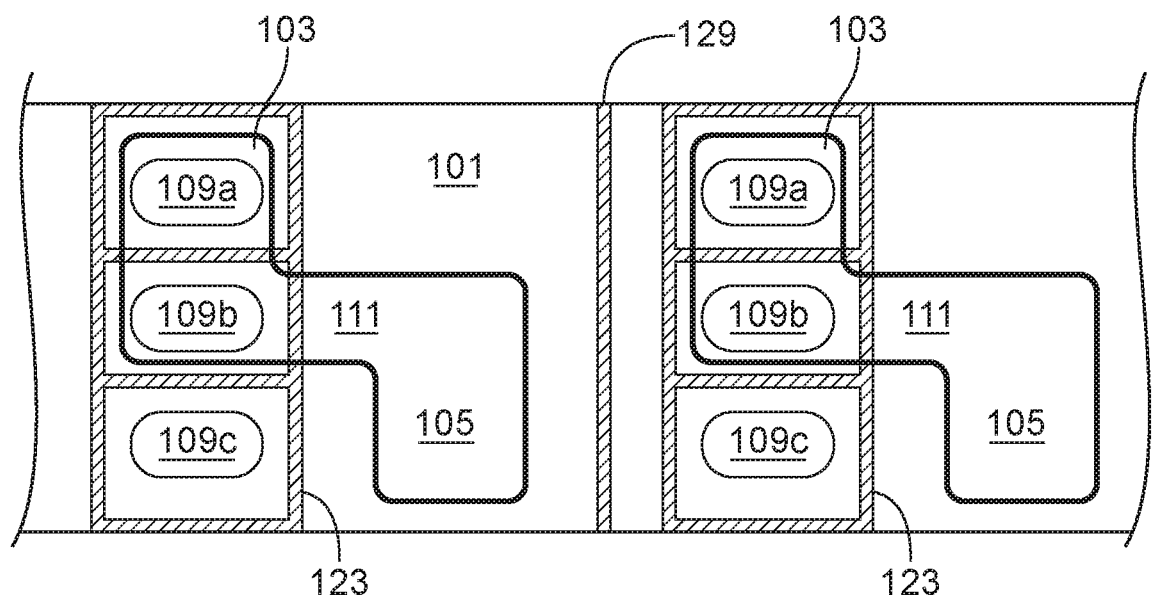
FIG. 5A is a 2-D schematic diagram of an embodiment of a valve in accordance with this disclosure, showing the spool in a first position.
Figure 5B:
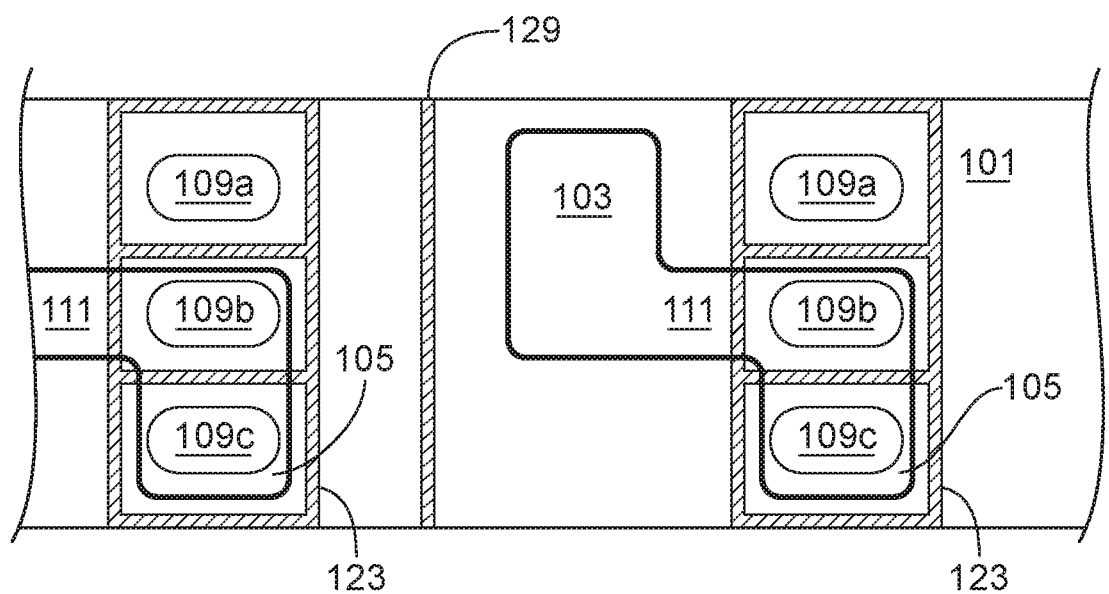
FIG. 5B is a 2-D schematic diagram of the embodiment of FIG. 5A, showing the spool in a second position.

The valve 100 can include a housing 119 disposed over the sleeve 107 that includes a port 121 for each window (e.g., as shown in FIG. 2). In certain embodiments, at least one seal 123 (e.g., as shown in FIGS. 5A and 5B) can be disposed between the sleeve 107 and the housing 119 such that each window 109 is fluidly isolated between the sleeve 107 and the housing 119. The at least one seal 123 can include at least one ladder seal or any other suitable seal and can be disposed in one or more sleeve seal slots 125.

Figure 4:
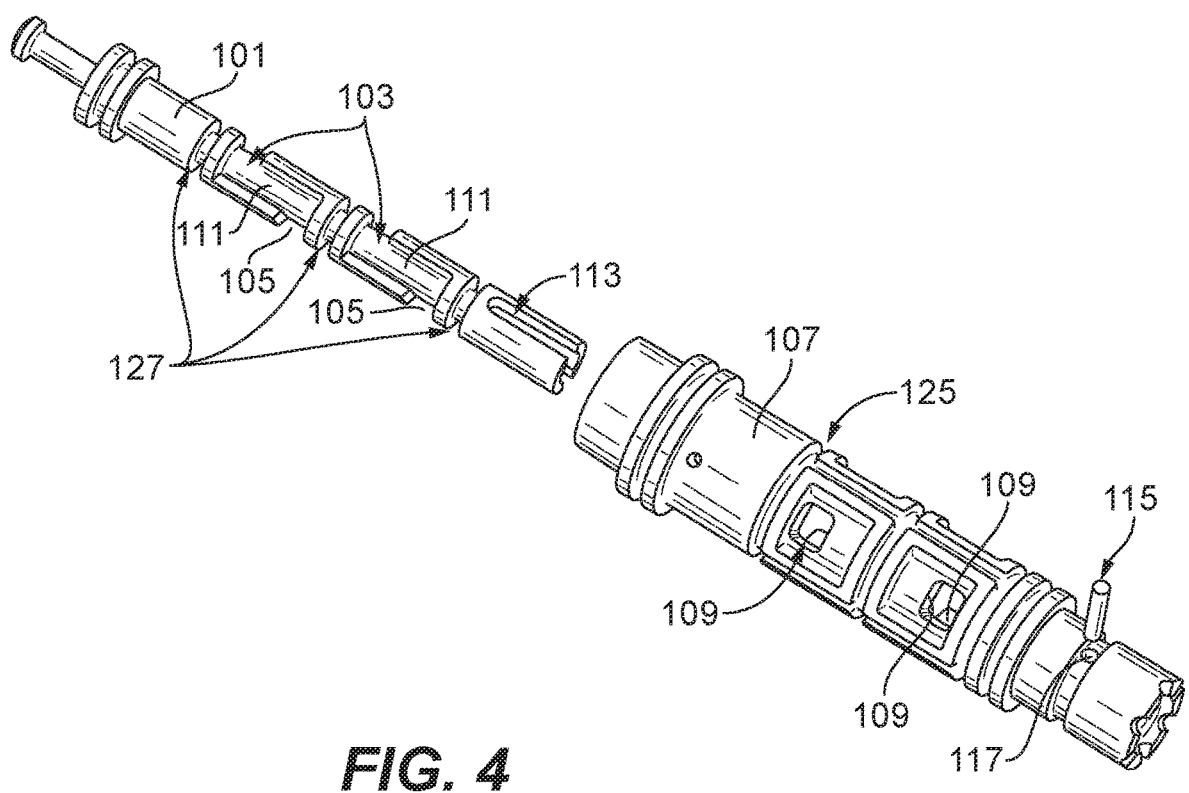
FIG. 4 is an exploded perspective view of the embodiment of FIG. 1, not showing the housing and showing the spool and the sleeve separated from each other.

In certain embodiments, the spool 101 can include a plurality of sets of first and second circumferential flow channels 103, 105 in different axial positions. The spool 101 can include one or more seal channels 127 defined therein between the plurality of sets of channels 103, 105 as shown in FIG. 4. The valve 100 can include a seal 129 (e.g., as shown in FIGS. 5A and 5B). disposed in each seal channel 127 of the spool 101, for example. The seals 129 in the seal channels 127 can be ring seals, for example, or any other suitable seal.

Figure 6:
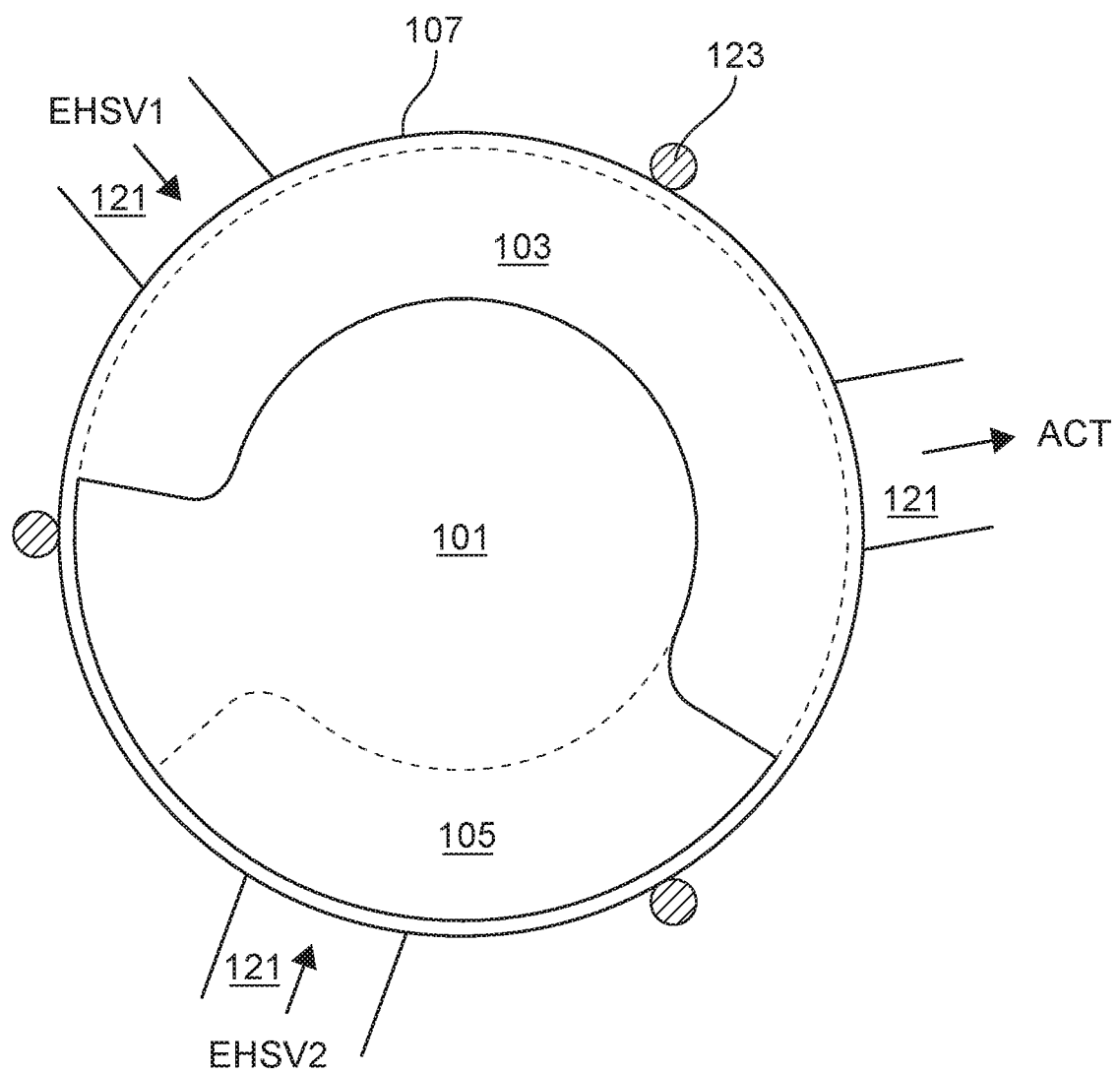
FIG. 6 is a cross-sectional schematic view of an embodiment of a valve in accordance with this disclosure, shown in a first position in solid and a second position in phantom.

In certain embodiments, referring additionally to FIG. 5A the first plurality of the at least three windows 109 can include a first window 109a and a second window 109b in the first position. In the second position, as shown in FIG. 5B, the second plurality can include a second window 109b and a third window 109c. FIG. 6 shows the transition between a first position and a second position in cross-section for this embodiment for example. This arrangement can allow switching between two sources and/or drains, for example (e.g., for a switching from a primary hydraulic system to a backup hydraulic system). Any other window 109 arrangements and fluid connections in the first and second positions are contemplated herein.

Figure 7:
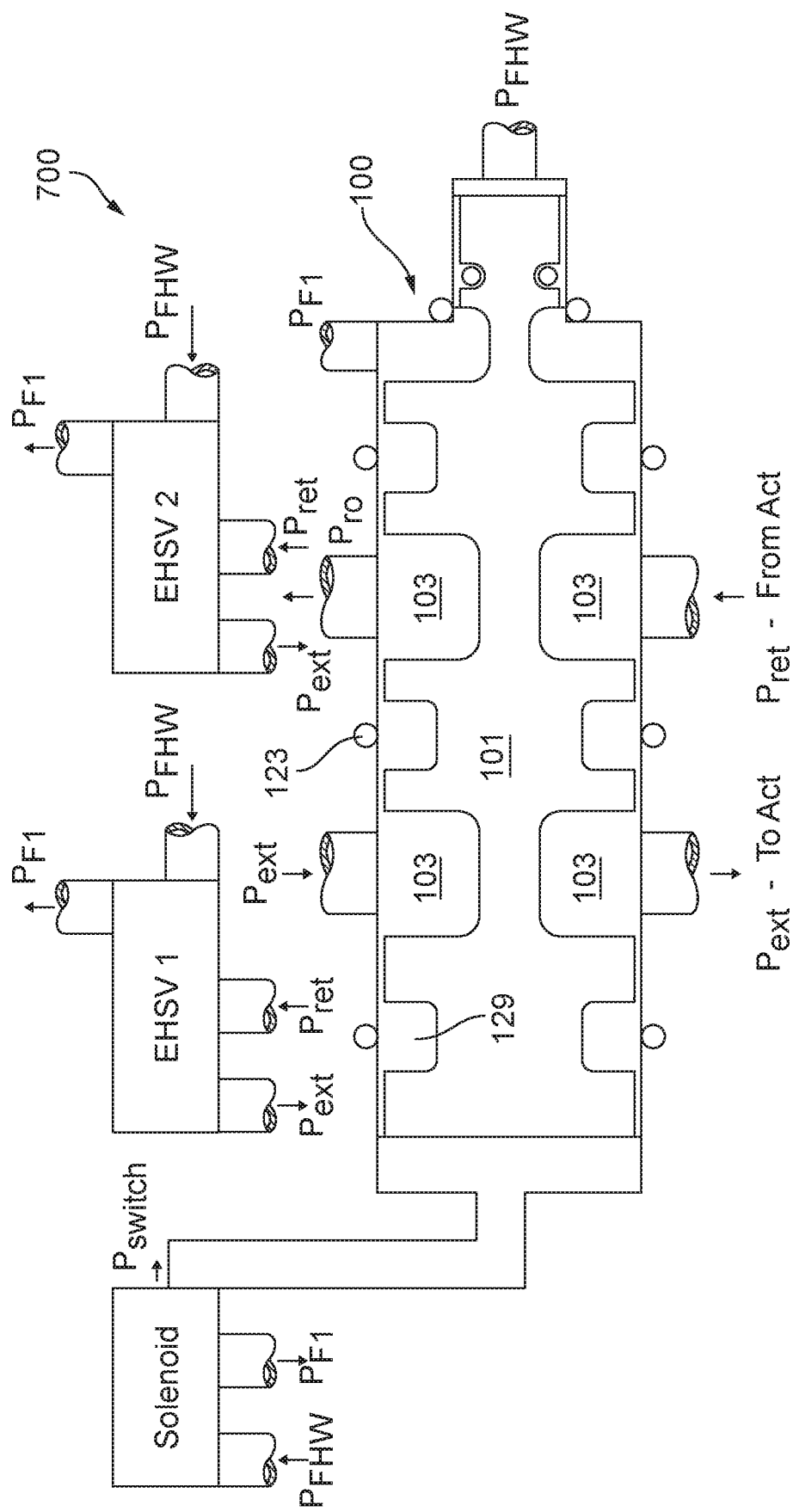
FIG. 7 is a schematic cross-sectional elevation of an embodiment of a system in accordance with this disclosure.

In accordance with at least one aspect of this disclosure, referring additionally to FIG. 7, an aircraft hydraulic system 700 can include any suitable embodiment of a transfer valve 100 as described herein. As show, the valve 100 can be actuated via a pressurized circuit (e.g., having a solenoid valve). Any other suitable actuation (e.g., mechanical, electrical, etc.) is contemplated herein, and actuation can be manual or automated in any suitable manner. It is contemplated that the transfer valve 100 can be used for any purpose in any application, e.g., hydraulic, fuel, oil, or other fluid system (e.g., for signaling). The valve 100 can be used with any system or flow scheme where switching of two or more pressure signals (e.g., two pressure signals as shown) happens at the same time.

The spool 101 and/or the sleeve 107 can be made of metal (and/or any other suitable material). The spool 101 can be disposed in the sleeve 107 in a tight tolerance fit or in any other suitable manner.

In accordance with at least one aspect of this disclosure, a method of actuating a transfer valve includes axially moving a spool between a first position and a second position relative to a sleeve surrounding the spool, and altering fluidic communication between a first plurality of circumferentially defined windows and a second plurality of circumferentially defined windows in the same axial position as the first plurality of circumferentially defined windows through the axial movement of the spool.

Embodiments collapse the axial size of valves and reduce size/weight of valves. Embodiments improve the architecture of transfer valves in order to reduce weight and size of both the valve itself and the housing. Embodiments can drive two separate signal sources and an outlet signal into a single sealing location. The signal sources can be separated by a ladder seal. The valve can be timed to provide optimum flow connection. The switching between signal sources can be accomplished via a spool. Embodiments can be anti-rotated to align with the signal ports. With each signal source having its own land, the spool can accommodate seals between each signal source to greatly reduce leakage.

Embodiments allow axial length compared to existing valves to decrease by about 25-50%, and leakage in valves can decrease by a large margin. Embodiments improve both the packaging of the valves and the performance. Embodiments can also be applied to combining multiple two position valves into the same valve in order to save weight and packaging. Reduced leakage of the valve may lead to a large reduction in the overall control leakage, which could lead to a smaller pump being required, reducing weight further.

The methods and systems of the present disclosure, as described above and shown in the drawings, provide for transfer valves with superior properties. While the apparatus and methods of the subject disclosure have been shown and described with reference to embodiments, those skilled in the art will readily appreciate that changes and/or modifications may be made thereto without departing from the spirit and scope of the subject disclosure.

What is claimed is:

1. A transfer valve, comprising:
 a spool comprising a first circumferential flow channel at a first axial position of the spool and a second circumferential flow channel at a second axial position of the spool, wherein the first circumferential flow channel and the second circumferential flow channel have different circumferential positions and are defined only partially circumferentially; and
 a sleeve disposed over the spool, the sleeve including at least three windows defined through the sleeve at an axial position of the sleeve, each window having a different circumferential position on the sleeve,
 wherein the spool is configured to translate within the sleeve between a first position and a second position,
 wherein the first circumferential flow channel of the spool is configured to fluidly connect a first plurality of the at least three windows in the first position, and the second circumferential flow channel is configured to connect a second plurality of the at least three windows in the second position, wherein the first plurality of windows is different by at least one window from the second plurality of windows such that a first window will be closed and a second window will be opened, wherein the first plurality of the at least three windows includes a first window and a second window, wherein the second plurality includes the second window and a third window.

2. The valve of claim 1, wherein the spool further includes an at least partially axial channel portion that connects the first circumferential flow channel and the second circumferential flow channel.

3. The valve of claim 1, wherein the spool includes an anti-rotation slot defined in a portion thereof for receiving an anti-rotation pin, the slot being dimensioned to allow translation between the first position and the second position, but to prevent rotation of the spool within the sleeve.

4. The valve of claim 1, wherein the sleeve includes a pin hole defined therethrough and configured to receive an anti-rotation pin, wherein the anti-rotation pin extends radially through the sleeve.

5. The valve of claim 4, further comprising the anti-rotation pin disposed in the pin hole of the sleeve and in the anti-rotation slot of the spool.

6. The valve of claim 1, further comprising a housing disposed over the sleeve that includes a port for each of the at least three windows.

7. The valve of claim 6, further comprising at least one seal disposed between the sleeve and the housing such that each window is fluidly isolated between the sleeve and the housing.

8. The valve of claim 7, wherein the at least one seal includes at least one ladder seal.

9. The valve of claim 1, wherein the spool includes a plurality of sets of first and second circumferential flow channels in different axial positions.

10. The valve of claim 9, wherein the spool includes one or more seal channels defined therein between the plurality of sets of first and second circumferential flow channels.

11. The valve of claim 10, further comprising a seal disposed in each seal channel.

12. The valve of claim 11, wherein the seals are ring seals.

13. An aircraft hydraulic system, comprising a transfer valve, the transfer valve comprising:
 a spool comprising a first circumferential flow channel at a first axial position of the spool and a second circumferential flow channel at a second axial position of the spool, wherein the first circumferential flow channel and the second circumferential flow channel have different circumferential positions and are defined only partially circumferentially; and
 a sleeve disposed over the spool, the sleeve including at least three windows defined through the sleeve at an axial position of the sleeve, each window having a different circumferential position on the sleeve,
 wherein the spool is configured to translate within the sleeve between a first position and a second position,
 wherein the first circumferential flow channel of the spool is configured to fluidly connect a first plurality of the at least three windows in the first position, and the second circumferential flow channel is configured to connect a second plurality of the at least three windows in the second position, wherein the first plurality of windows is different by at least one window from the second plurality of windows such that a first window will be closed and a second window will be opened, wherein the first plurality of the at least three windows includes a first window and a second window, wherein the second plurality includes the second window and a third window.

14. A method of actuating a transfer valve comprising:
 axially moving a spool between a first position and a second position relative to a sleeve surrounding the spool; and
 altering fluidic communication between a first plurality of circumferentially defined windows and a second plurality of circumferentially defined windows in the same axial position as the first plurality of circumferentially defined windows through the axial movement of the spool, wherein altering fluidic communication includes closing a first window and opening a second window, wherein the first plurality of the at least three windows includes a first window and a second window, wherein the second plurality includes the second window and a third window.

15. A transfer valve, comprising:
a spool comprising a first circumferential flow channel at a first axial position of the spool and a second circumferential flow channel at a second axial position of the spool, wherein the first circumferential flow channel and the second circumferential flow channel have different circumferential positions and are defined only partially circumferentially; and
a sleeve disposed over the spool, the sleeve including at least three windows defined through the sleeve at an axial position of the sleeve, each window having a different circumferential position on the sleeve,
wherein the spool is configured to translate within the sleeve between a first position and a second position,
wherein the first circumferential flow channel of the spool is configured to fluidly connect a first plurality of the at least three windows in the first position, and the second circumferential flow channel is configured to connect a second plurality of the at least three windows in the second position, wherein the spool includes an anti-rotation slot defined in a portion thereof for receiving an anti-rotation pin, the slot being dimensioned to allow translation between the first position and the second position, but to prevent rotation of the spool within the sleeve.

16. A transfer valve, comprising:
a spool comprising a first circumferential flow channel at a first axial position of the spool and a second circumferential flow channel at a second axial position of the spool, wherein the first circumferential flow channel and the second circumferential flow channel have different circumferential positions and are defined only partially circumferentially; and
a sleeve disposed over the spool, the sleeve including at least three windows defined through the sleeve at an axial position of the sleeve, each window having a different circumferential position on the sleeve,
wherein the spool is configured to translate within the sleeve between a first position and a second position,
wherein the first circumferential flow channel of the spool is configured to fluidly connect a first plurality of the at least three windows in the first position, and the second circumferential flow channel is configured to connect a second plurality of the at least three windows in the second position, wherein the sleeve includes a pin hole defined therethrough and configured to receive an anti-rotation pin, wherein the anti-rotation pin extends radially through the sleeve.

17. A transfer valve, comprising:
a spool comprising a first circumferential flow channel at a first axial position of the spool and a second circumferential flow channel at a second axial position of the spool, wherein the first circumferential flow channel and the second circumferential flow channel have different circumferential positions and are defined only partially circumferentially; and
a sleeve disposed over the spool, the sleeve including at least three windows defined through the sleeve at an axial position of the sleeve, each window having a different circumferential position on the sleeve,
wherein the spool is configured to translate within the sleeve between a first position and a second position,
wherein the first circumferential flow channel of the spool is configured to fluidly connect a first plurality of the at least three windows in the first position, and the second circumferential flow channel is configured to connect a second plurality of the at least three windows in the second position, wherein the spool includes a plurality of sets of first and second circumferential flow channels in different axial positions, wherein the spool includes one or more seal channels defined therein between the plurality of sets of first and second circumferential flow channels.

* * * * *